Figure 1:
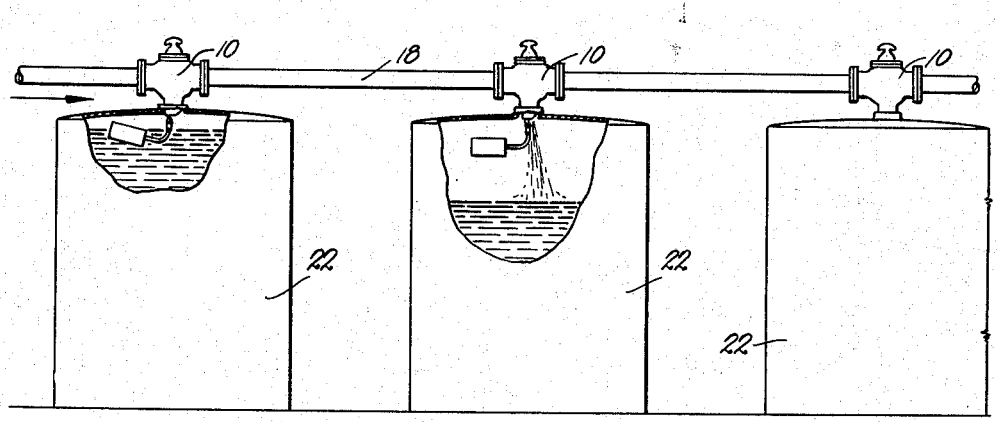

Nov. 24, 1953     J. A. McCARTNEY     2,660,188

AUTOMATIC TANK VALVE FOR FLOW LINES

Filed May 12, 1952

INVENTOR.
Joseph A. McCartney
BY
ATTORNEY.

Patented Nov. 24, 1953

2,660,188

UNITED STATES PATENT OFFICE 2,660,188

AUTOMATIC TANK VALVE FOR FLOW LINES

Joseph A. McCartney, Baxter Springs, Kans., assignor, by mesne assignments, to McCartney Engineering & Research Corporation, Inc., Baxter Springs, Kans., a corporation Application May 12, 1952, Serial No. 287,320

2 Claims. (Cl. 137—122)

1

This invention relates to valve structure for the control of fluids, particularly liquids, and has for its primary object the provision of automatic means adapted for disposition within a flow line for successively filling a series of tanks or other containers to a predetermined level through the simple expedient of pre-setting by the operator.

It is the most important object of the present invention to provide improved valve structure of the aforementioned character including a reciprocable valve suitably guided and actuated by spring pressure for positive and efficient operation without the need of attention by workmen.

Another important object hereof is to provide valve structure including a hollow body arranged with a partition for directing the flow of fluid in either of two directions, the partition having an annular ring therewithin for guiding the valve, the latter being in turn provided with a guide element slidable within the annular ring.

A further object hereof is to provide in valve structure as just above mentioned, an annular ring that is shiftable within the partition for supporting the same, there being a spring for holding the ring biased toward a position resting upon the partition, thereby compensating for liquid pressure on one side of the ring.

A further object hereof is to provide valve structure wherein the actuating means for the reciprocable valve, i. e., the manual member for shifting the valve to a locked position, is itself reciprocable in the valve body and in the valve.

Other objects hereof include the way in which improved latch mechanism is operably coupled with a float through a toggle assembly for releasably holding the valve at one end of its path of travel; the way in which the valve head is seated against the annular ring insert when in the locked position; the way in which the spring for returning the valve to the opposite end of its path of travel, as well as the above-mentioned spring for the annular insert, are compressed when the valve is locked; the way in which a tubular outlet in the valve body is utilized as another means for guiding the valve; and many additional, more minor objects, all of which will be made clear as the following specification progresses.

Figure 2:
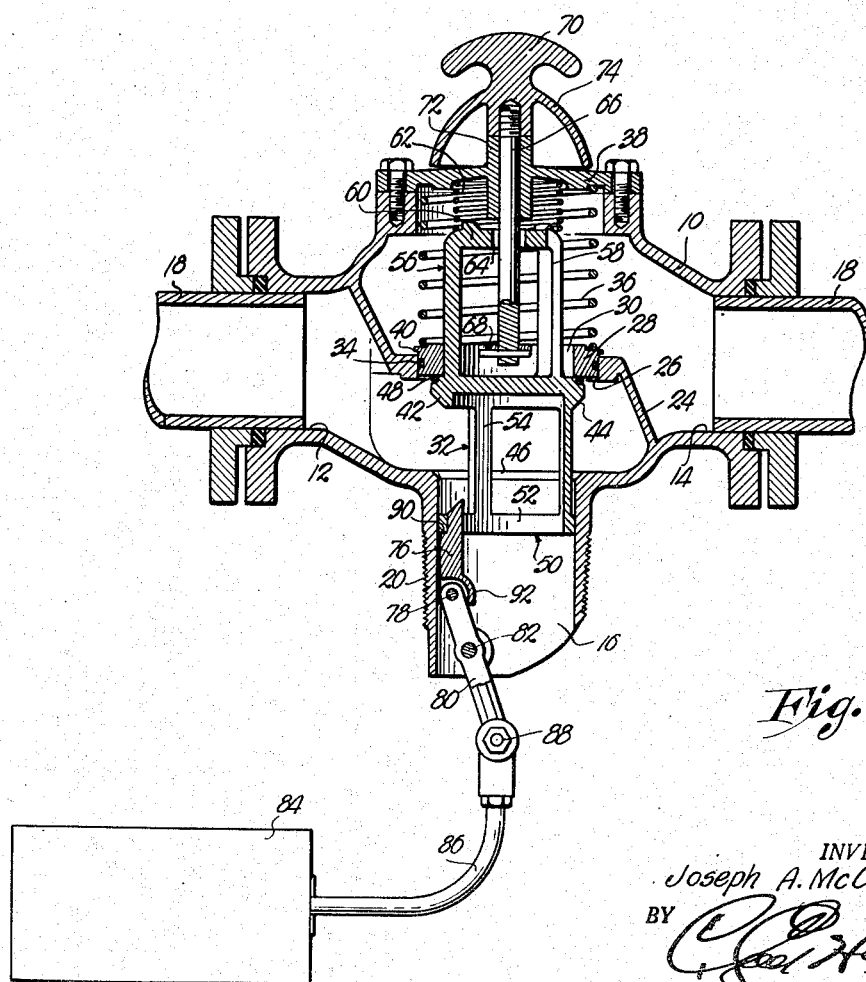

In the drawing:

Figure 1 is a side elevational view of a flow line with its associated tanks, parts being broken away to illustrate float positions forming a part of the valve structure hereof; and Fig. 2 is a substantially central, vertical, cross-sectional view through one of the valves per se, the float being in elevation.

2

The valve structure hereof includes a hollow body 10, provided with an inlet opening 12 at one side thereof; an outlet opening 14 at the opposite side thereof; and a tubular outlet 16 depending from the body 10. The flow line 18 within which the body 10 is interposed, is releasably coupled with inlet 12 and outlet 14, as shown in Fig. 2 of the drawing.

The tubular outlet 16 is externally threaded as at 20, adapting the same for connection with a tank or other receptacle 22. A substantially Z-shaped partition 24 within the body 10 is interposed between inlet 12 and outlet 14, and has a perforation 26 directly above and in axial alignment with the longitudinal axis of the tube 16.

An annular ring insert 28 is shiftably mounted in the perforation 26 for vertical reciprocation, presenting an opening 30 for flow of fluid from inlet 12 to outlet 14 when a valve broadly designated by the numeral 32, is at the lowermost end of its path of travel. Sealing means 34 surrounds the annular ring 28 and a spring 36 in overlying engagement with the ring 28, bears at its uppermost end against a removable top plate 38 forming a part of the body 10. Spring 36 therefore, yieldably holds the ring 28 biased toward the lowermost end of its path of travel which is limited by an annular external shoulder 40 on the ring 28, overlying the partition 24 and engageable therewith when the valve 32 is at the lowermost end of its path of travel. The valve 32 includes a head 42 having an annular bevel 44 adapted to engage a seat 46 formed in the body 10 at the uppermost end of the tubular outlet 16. The lowermost flat face of the ring 28 presents a second seat for the valve 32, head 42 having a seal 48 surrounding the same and engageable with the lowermost face of the ring 28 in the manner illustrated in Fig. 2 of the drawing.

A guide member 50 depending from the head 42, includes a ring 52 having a slide-fit within the tubular outlet 16 and connected with the head 42 by means of a plurality of vertical bars 54. Valve 32 is similarly guided within the ring 28 through the medium of a guide element 56 having a plurality of bars 58 extending upwardly from the head 42. The uppermost end 60 of the guide element 56, has a spring 62 bearing thereagainst, which spring 62 is confined within the spring 36 and also bears against the plate 38. The uppermost end 60 of the guide element 56 has an opening 64 for clearing an elongated, actuating member 66.

The stem-like actuating member 66 has a head 68 on the lowermost end thereof that is engageable with the wall 60 and a handle 70 removably secured to its uppermost end. Actuating member or stem 66 is freely reciprocable within a bearing 72 integral with the plate 38, and the valve structure is protected by means of a hood 74 integral with the handle 70.

A latch 76 is pivotally mounted as at 78 on a toggle assembly that includes a link 80 pivotally carried by the tubular outlet 16 therewithin as at 82. A float 84 has an arm 86 that is adjustably, yet rigidly secured, to the link 80 by take-up bolt and nut means. Latch 76 has a shoulder 90 adapted to underlie the ring 52 as shown in Fig. 2, and an over-hang 92 on the latch 76 engages the link 80 to limit the extent of swinging movement of the latch 76 in one direction with respect to the link 80.

In operation, a series of valve structures such as detailed in Fig. 2 of the drawing, may be interposed within the flow line 18, one for each tank 22 respectively, as illustrated in Fig. 1 of the drawing. If it is desired to fill the tanks 22 successively, all of the valve structures are manually set by raising the handle 70 to lift the valves 32 thereof to the position illustrated in Fig. 2 of the drawing. If the floats 84 are at the lowermost ends of their paths of travel by virtue of the tanks 22 not being full, such raising of the valves 32 against the action of their springs 62, will cause the latches 76 to automatically snap into position with the shoulders 90 thereof underlying the corresponding rings 52. It is particularly notable that the spring 36 is also compressed when the latch 76 is in the operating position, it being necessary to raise the ring 28 slightly with the shoulder 40 above the partition 24 as shown in Fig. 2. As soon as the valve is thus locked in position, the operator may release the handle 70, whereupon the head 68 will move away from the wall 60 and the hood 74 will come to rest upon the plate 38.

It is clear that liquid will flow from inlet 12 to the outlet tube 16, and thereby to the tank 22 therebeneath when the head 42 is in closing relationship to the opening 30 in ring 28. As soon as the liquid within the tank 22 rises to a position for raising the float 84, link 80 will be swung on pivot 82 to shift the latch 76 from beneath the ring 52, whereupon the valve 32 will fall by gravity with the head 42 thereof engaging seat 46. Springs 36 and 62 both aid in forcing the valve 32 downwardly and as soon as shoulder 40 re-engages the partition 24, spring 62 with the action of gravity, assures a positive seating of the head 42 with respect to the outlet tube 16. The flow thereupon is from inlet 12, through opening 30, to outlet 14 and thence to the next tank 22.

It is appreciated that if any tank in the series thereof is not to receive liquid, the operator simply leaves the corresponding valve 32 thereof in the unlocked position with head 42 closing the outlet 16.

Having thus described the invention what is claimed as new and desired to be secured by Letters Patent is:

1. Valve structure comprising a hollow body having an inlet port in one side thereof, an outlet port in the opposite side thereof, an outlet tube depending from the bottom thereof, and a valve seat adjacent the tube; a partition in the body between said ports having a perforation; a vertically reciprocable ring in said perforation above the tube and aligned therewith; a shoulder on the ring overlying the partition for limiting the extent of downward movement thereof; a spring disposed in the body in overlying engagement with the ring for holding the same biased toward the partition; a vertically reciprocable valve having a head alternately engageable with said ring and said seat and provided with an upstanding guide element slidable in the ring and a depending guide member slidable in the tube; a spring in the body between the guide element and the top of the body for holding the head biased toward the seat; a releasable latch in the tube and engageable with said member for holding the head in engagement with the ring; a float operably connected with the latch for releasing the same; and a vertically reciprocable actuating stem extending through said top of the body for lifting the valve to move the head against the ring.

2. Valve structure as set forth in claim 1 wherein said latch is disposed to hold both springs compressed when the latch is in a position holding the head against the ring.

JOSEPH A. McCARTNEY.

References Cited in the file of this patent

UNITED STATES PATENTS

| Number | Name | Date |
|---|---|---|
| 1,736,933 | Morgan | Nov. 26, 1929 |
| 1,912,786 | Moe | June 6, 1933 |
| 2,560,104 | Guyton | July 10, 1951 |